United States Patent
Raikar et al.

(10) Patent No.: US 12,397,800 B2
(45) Date of Patent: Aug. 26, 2025

(54) SYSTEMS AND METHODS FOR AUTOMATICALLY DISPENSING ROAD MARKINGS FOR AUTONOMOUS VEHICLE SIGNALING

(71) Applicant: TORC Robotics, Inc., Blacksburg, VA (US)

(72) Inventors: Akshay Pai Raikar, Blacksburg, VA (US); Joseph Fox-Rabinovitz, Austin, TX (US)

(73) Assignee: TORC ROBOTICS, INC., Blacksburg, VA (US)

( * ) Notice: Subject to any disclaimer, the term of this patent is extended or adjusted under 35 U.S.C. 154(b) by 170 days.

(21) Appl. No.: 18/219,609

(22) Filed: Jul. 7, 2023

(65) Prior Publication Data

US 2025/0010864 A1 Jan. 9, 2025

(51) Int. Cl.
*B60W 40/06* (2012.01)
*B60W 60/00* (2020.01)
*E01C 23/16* (2006.01)

(52) U.S. Cl.
CPC ............ *B60W 40/06* (2013.01); *B60W 60/00* (2020.02); *E01C 23/16* (2013.01); *B60W 2552/00* (2020.02)

(58) Field of Classification Search
None
See application file for complete search history.

(56) References Cited

U.S. PATENT DOCUMENTS

| | | | |
|---|---|---|---|
| 10,976,746 B2 | 4/2021 | Hendricks et al. | |
| 11,828,610 B2 | 11/2023 | Yeung | |
| 2018/0079359 A1* | 3/2018 | Park | G08G 1/163 |
| 2022/0284223 A1* | 9/2022 | Lev | G08G 1/09623 |
| 2023/0384096 A1 | 11/2023 | Salter et al. | |
| 2023/0419606 A1 | 12/2023 | Stenson et al. | |

* cited by examiner

*Primary Examiner* — Hitesh Patel
*Assistant Examiner* — Wenyuan Yang
(74) *Attorney, Agent, or Firm* — Armstrong Teasdale LLP

(57) ABSTRACT

An autonomous vehicle comprises a sensor, a plurality of paint dispensers, and one or more processors. The processors can be configured to collect, using the sensor, data regarding an environment surrounding the autonomous vehicle as the autonomous vehicle is moving on a surface; detect an event in the environment surrounding the autonomous vehicle from the collected data; determine an event type of the event based on the collected data; select a paint dispenser from the plurality of paint dispensers based on the determined event type; and automatically dispense paint from the selected paint dispenser onto the surface.

20 Claims, 5 Drawing Sheets

SYSTEMS AND METHODS FOR AUTOMATICALLY DISPENSING ROAD MARKINGS FOR AUTONOMOUS VEHICLE SIGNALING

TECHNICAL FIELD

The present disclosure relates generally to vehicles and, more specifically, to systems and methods for dispensing road markings outside of a visible spectrum by an autonomous vehicle for autonomous vehicle signaling.

BACKGROUND

The use of autonomous vehicles has become increasingly prevalent in recent years, with the potential for numerous benefits, such as improved safety, reduced traffic congestion, and increased mobility for people with disabilities. Roadways can include highly variable conditions, with traffic flow, congestion, pull overs, crashes, construction zones, and bus stops contributing to non-permanent, irregular conditions. Autonomous vehicles can collect a large variety of data regarding the changing environment surrounding the autonomous vehicles. However, given the limited fields of view of the sensors on the autonomous vehicles, autonomous vehicles may detect irregular conditions too late to react to the irregular conditions or may fail to detect the irregular conditions altogether.

SUMMARY

Roadway systems across the world experience events that cause changes to the conditions of a road. These events may include man generated events (e.g., construction, crashes, pull over, rush hour, etc.), nature-based events (e.g., hurricanes, tornadoes, floods, etc.), or other events that may produce non-permanent, irregular conditions on the road. As a vehicle passes through a road segment affected by one or more of these events, the vehicle may determine the condition (or the event that caused the condition) of the road segment. Subsequent vehicles may benefit from obtaining information about the road segment before reaching the road segment. For example, a first vehicle may approach a construction zone and may determine to merge into a neighboring lane to avoid the construction zone. A second vehicle behind the first vehicle may improve route efficiency and avoid congestion by merging into the neighboring lane before approaching the construction zone. In this way, route planning for autonomous vehicles may be improved.

With the deployment of autonomous vehicles on public roads, and due to the technical nature of the autonomous vehicles, improvements to information sharing between vehicles about non-permanent conditions are possible. For example, an automated (e.g., autonomous) vehicle system implementing the systems and methods described herein may result in improved communication between vehicles. For example, a computer of the autonomous vehicle system may operate to collect, using a sensor of the autonomous vehicle, data regarding an environment surrounding the autonomous vehicle as the autonomous vehicle is moving on a surface. The autonomous vehicle may detect an event (e.g., a car crash, excessive traffic, a wet road, etc.) in the environment surrounding the autonomous vehicle from the collected data. The autonomous vehicle may determine an event type of the detected event based on the collected data. The autonomous vehicle may select a paint dispenser from multiple paint dispensers included in the autonomous vehicle based on the determined event type. The autonomous vehicle may automatically dispense paint from the selected paint dispenser onto the surface to convey information about the event to other vehicles.

To determine the event type, the computer may utilize one or more algorithms. For example, the computer may analyze image or video data depicting the event. The computer may use a neural network model or other image processing algorithm to determine the type of the event. For example, event types may include temporal designations (e.g., a short duration event, a long duration event, etc.), characteristic designations (e.g., construction zone, road debris, etc.), emergency designations (e.g., high emergency, low emergency), or any other categorization of event type.

The computer may select the paint dispenser based on the event type. For example, the computer may detect an event while driving on the road. Responsive to doing so, the computer may determine a first event type associated with a first duration of time. In an example, the first event type may be a car crash that is associated with a short duration of time (e.g., 1 hour, 2 hours, etc.). The computer may select a first paint dispenser associated with the event type and the short duration of time. The paint dispenser may dispense paint that indicates the event type and the short duration of time. For example, the computer may be configured with a database including paint types (e.g., color, wavelength, size, shape, etc.) corresponding to different event types and durations. The paint may be non-permanent such that the paint disappears (e.g., dissolves, is undetectable by the sensor) after the duration of time transpires. In some cases, the database may include paint types corresponding to navigational information that indicate navigational actions. A computer of a second autonomous vehicle may detect, via a sensor, the paint and determine the paint type. The computer may operate the second autonomous vehicle to perform a navigational action responsive to detection of the paint and identifying the paint type.

Advantageously, by performing the methods or adopting the systems as described herein, vehicles can provide road specific information associated with non-permanent conditions to other vehicles. This may result in increased efficiency for route planning, reduced congestion and latency in completing a route, and increased communication between vehicles (e.g., in areas without communication via a network, without wireless communication between the vehicles), among other advantages.

While the examples described herein are described in the context of autonomous vehicles, any vehicle with a computer that can detect the tracking tags may utilize the systems and methods as described herein.

In at least one aspect, the present disclosure describes an autonomous vehicle. The autonomous vehicle can include one or more sensors, multiple paint dispensers and one or more processors coupled with the one or more sensors and the multiple paint dispensers. The one or more processors can be configured to collect, using the sensors, data regarding an environment surrounding the autonomous vehicle as the autonomous vehicle is moving on a surface; detect an event in the environment surrounding the autonomous vehicle from the collected data; determine an event type of the event based on the collected data; select a paint dispenser from the plurality of paint dispensers based on the determined event type; and automatically dispense paint from the selected paint dispenser onto the surface.

In another aspect, the present disclosure describes a method for dispensing paint onto a surface. The method can include collecting, using a sensor, data regarding an environment surrounding a vehicle as the vehicle is moving on the surface; detecting an event in the environment surrounding the vehicle from the collected data; determining an event type of the event based on the collected data; selecting a paint dispenser from a plurality of paint dispensers based on the determined event type, each dispenser of the plurality of paint dispensers corresponding to a different type of event and comprising paint of a different spectral band, wherein paint from each of the plurality of paint dispensers is outside of a visible spectrum; and automatically dispensing paint from the selected paint dispenser onto the surface.

In another aspect, the present disclosure describes a controller. The controller can include one or more processors configured to collect, using the sensor, data regarding an environment surrounding an autonomous vehicle as the autonomous vehicle is moving on a surface; detect an event in the environment surrounding the autonomous vehicle from the collected data; determine an event type of the event based on the collected data; select a paint dispenser from a plurality of paint dispensers based on the determined event type, each dispenser of the plurality of paint dispensers corresponding to a different type of event and comprising paint of a different spectral band, wherein paint from each of the plurality of paint dispensers is outside of a visible spectrum; and automatically dispense paint from the selected paint dispenser onto the surface.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting and it may be readily understood that certain aspects of the disclosed systems and methods can be variously arranged and combined, all of which arrangements and combinations are contemplated by this disclosure.

Figure 1:
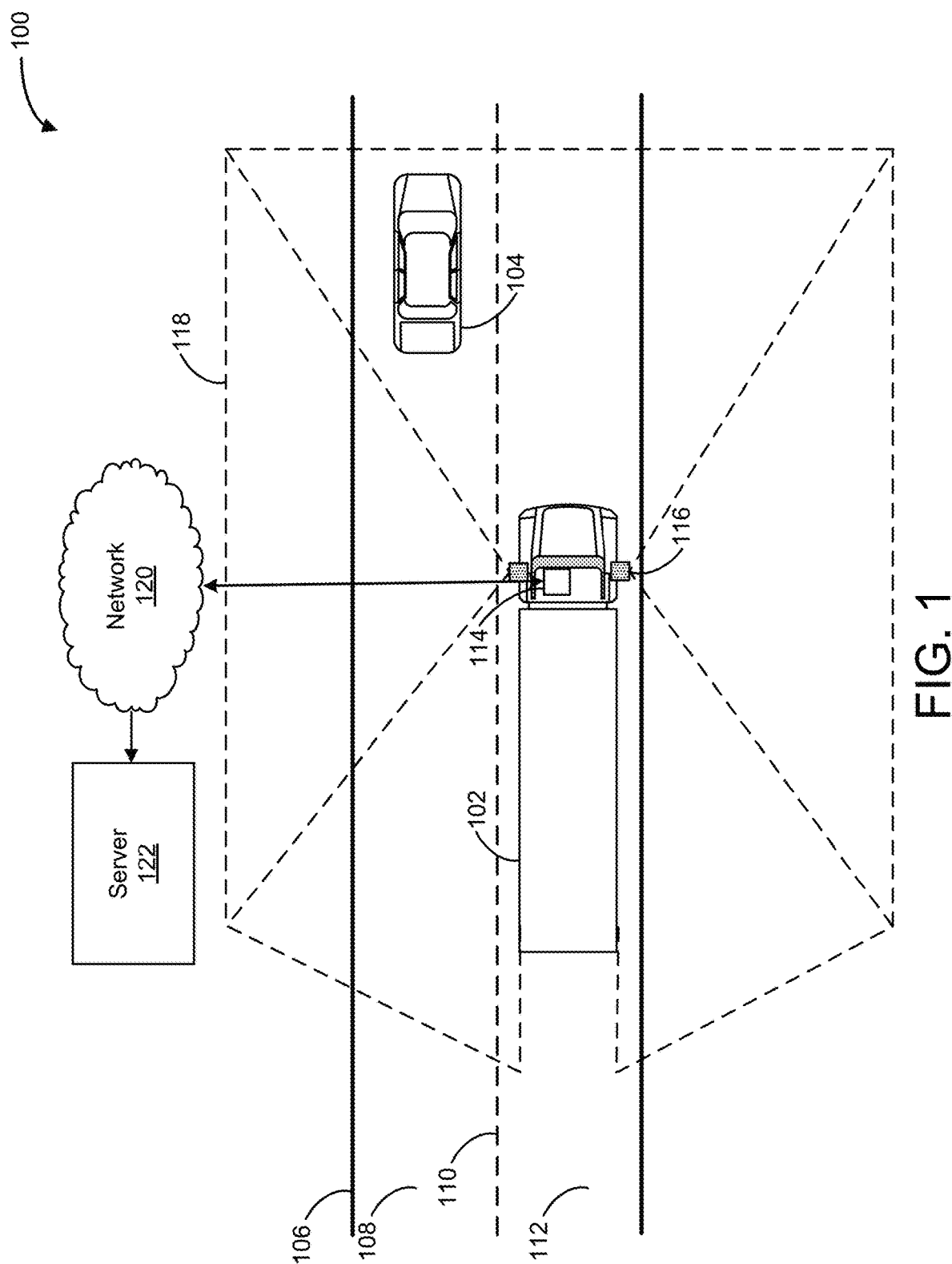
FIG. 1 is a bird's-eye view of a roadway including a schematic representation of a vehicle and aspects of an autonomy system of the vehicle, according to an embodiment.

Referring to FIG. 1, the present disclosure relates to autonomous vehicles, such as an autonomous vehicle 102 having an autonomy system 114. The autonomy system 114 of the vehicle 102 may be completely autonomous (fully autonomous) or semi-autonomous. In one example, the autonomous system 114 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous. The present disclosure sometimes refers to autonomous vehicles as ego vehicles. The autonomy system 114 may be structured on at least three aspects of technology: (1) perception, (2) maps/localization, and (3) behaviors planning and control. The function of the perception aspect is to sense an environment surrounding the vehicle 102 and interpret the environment. To interpret the surrounding environment, a perception module 116 or engine in the autonomy system 114 of the vehicle 102 may identify and classify objects or groups of objects in the environment. For example, a perception module 116 may be associated with various sensors (e.g., light detection and ranging (LiDAR), camera, radar, etc.) of the autonomy system 114 and may identify one or more objects (e.g., pedestrians, vehicles, debris, etc.) and features of the roadway (e.g., lane lines) around the vehicle 102, and classify the objects in the road distinctly.

The maps/localization aspect of the autonomy system 114 may be configured to determine where on a pre-established digital map the vehicle 102 is currently located. One way to do this is to sense the environment surrounding the vehicle 102 (e.g., via the perception module 116), such as by detecting vehicles (e.g., a vehicle 104) or other objects (e.g., traffic lights, speed limit signs, pedestrians, signs, road markers, energy supply stations, etc.) from data collected via the sensors of the autonomy system 114, and to correlate features of the sensed environment with details (e.g., digital representations of the features of the sensed environment) on the digital map.

Once the systems on the vehicle 102 have determined the location of the vehicle 102 with respect to the digital map features (e.g., location on the roadway, upcoming intersections, road signs, etc.), the vehicle 102 can plan and execute maneuvers and/or routes with respect to the features of the digital map. The behaviors, planning, and control aspects of the autonomy system 114 may be configured to make decisions about how the vehicle 102 should move through the environment to get to the goal or destination of the vehicle 102. The autonomy system 114 may consume information from the perception and maps/localization modules to know where the vehicle 102 is relative to the surrounding environment and what other objects and traffic actors are doing.

FIG. 1 further illustrates an environment 100 for modifying one or more actions of the vehicle 102 using the autonomy system 114. The vehicle 102 is capable of communicatively coupling to a remote server 122 via a network 120. The vehicle 102 may not necessarily connect with the network 120 or the server 122 while it is in operation (e.g., driving down the roadway). That is, the server 122 may be remote from the vehicle, and the vehicle 102 may deploy with all the necessary perception, localization, and vehicle control software and data necessary to complete a mission of the vehicle 102 fully autonomously or semi-autonomously.

While this disclosure refers to a vehicle 102 as the autonomous vehicle, it is understood that the vehicle 102 could be any type of vehicle including a truck (e.g., a tractor trailer), an automobile, a mobile industrial machine, etc. While the disclosure will discuss a self-driving or driverless autonomous system, it is understood that the autonomous system could alternatively be semi-autonomous having varying degrees of autonomy or autonomous functionality. While the perception module 116 is depicted as being located at the front of the vehicle 102, the perception module 116 may be a part of a perception system with various sensors placed at different locations throughout the vehicle 102 (e.g., a front side of the vehicle 102, an energy input side of the vehicle).

Figure 2:
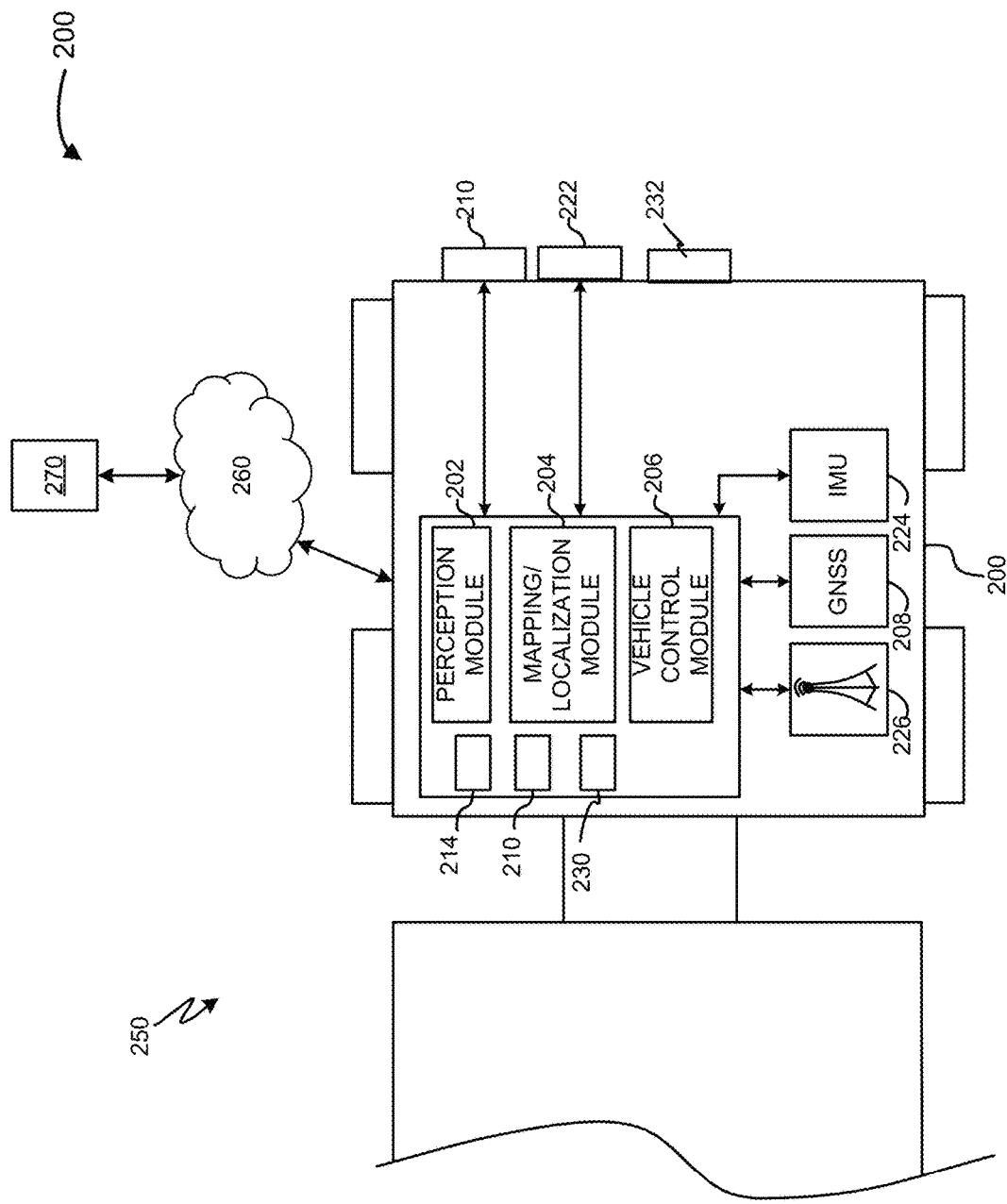
FIG. 2 is a schematic of an autonomy system of a vehicle, according to an embodiment.

FIG. 2 illustrates an example schematic of an autonomy system 250 of a vehicle 200, according to some embodiments. The autonomy system 250 may be the same as or similar to the autonomy system 114. The vehicle 200 may be the same as or similar to the vehicle 102. The autonomy system 250 may include a perception system including a camera system 220, a LiDAR system 222, a radar system 232, a Global Navigation Satellite System (GNSS) receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in various ways. As shown in FIG. 1, the perception systems aboard the autonomous vehicle may help the vehicle 102 perceive the vehicle 102's environment out to a perception area 118. The actions of the vehicle 102 may depend on the extent of the perception area 118. It is to be understood that the perception area 118 is an example area, and the practical area may be greater than or less than what is depicted.

The camera system 220 of the perception system may include one or more cameras mounted at any location on the vehicle 102, which may be configured to capture images of the environment surrounding the vehicle 102 in any aspect or field of view (FOV). The FOV can have any angle or aspect such that images of the areas ahead of, to the side, and behind the vehicle 102 may be captured. In some embodiments, the FOV may be limited to particular areas around the vehicle 102 (e.g., forward of the vehicle 102, at the side of the vehicle 102) or may surround 360 degrees of the vehicle 102. In some embodiments, the image data generated by the camera system(s) 220 may be sent to the perception module 202 and stored, for example, in memory 214.

The LiDAR system 222 may include a laser generator and a detector and can send and receive LiDAR signals. A LiDAR signal can be emitted to and received from any direction such that LiDAR point clouds (or "LiDAR images") of the areas ahead of, to the side, and behind the vehicle 200 can be captured and stored as LiDAR point clouds. In some embodiments, the vehicle 200 may include multiple LiDAR systems and point cloud data from the multiple systems may be stitched together.

The radar system 232 may estimate strength or effective mass of an object, as objects made out of paper or plastic may be weakly detected. The radar system 232 may be based on 24 GHz, 77 GHz, or other frequency radio waves. The radar system 232 may include short-range radar (SRR), mid-range radar (MRR), or long-range radar (LRR). One or more sensors may emit radio waves, and a processor may process received reflected data (e.g., raw radar sensor data) from the emitted radio waves.

In some embodiments, the system inputs from the camera system 220, the LiDAR system 222, and the radar system 232 may be fused (e.g., in the perception module 202). The LiDAR system 222 may include one or more actuators to modify a position and/or orientation of the LiDAR system 222 or components thereof. The LiDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the vehicle 200 (or object(s) therein). In some embodiments, the point cloud may be rendered as one or more polygon(s) or mesh model(s) through, for example, surface reconstruction. Collectively, the radar system 232, the LiDAR system 222, and the camera system 220 may be referred to herein as "imaging systems."

The GNSS receiver 208 may be positioned on the vehicle 200 and may be configured to determine a location of the vehicle 200 via GNSS data, as described herein. The GNSS receiver 208 may be configured to receive one or more signals from a global navigation satellite system (GNSS) (e.g., a GPS) to localize the vehicle 200 via geolocation. The GNSS receiver 208 may provide an input to and otherwise communicate with the mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the vehicle 200. For example, the IMU 224 may measure a velocity, acceleration, angular rate, and/or an orientation of the vehicle 200 or one or more of the vehicle 200's individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204 to help determine a real-time location of the vehicle 200 and predict a location of the vehicle 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5G, etc.). In some embodiments, the transceiver 226 may be configured to communicate with external network(s) via a wired connection, such as, for example, during initial installation, testing, or service of the autonomy system 250 of the vehicle 200. A wired/wireless connection may be used to download and install various lines of code in the form of digital files (e.g., HD digital maps), executable programs (e.g., navigation programs), and other computer-readable code that may be used by the system 250 to navigate the vehicle 200 or otherwise operate the vehicle 200, either fully autonomously or semi-autonomously.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. The autonomy system 250 may include a single microprocessor or multiple microprocessors that may include means for controlling the vehicle 200 to move (e.g., switch lanes) and monitoring and detecting other vehicles. Numerous commercially available microprocessors can be configured to perform the functions of the autonomy system 250. It should be appreciated that the autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote to the vehicle 200. Various other known circuits may be associated with the autonomy system 250, including signal-conditioning circuitry, communication circuitry, actuation circuitry, and other appropriate circuitry.

Figure 5:
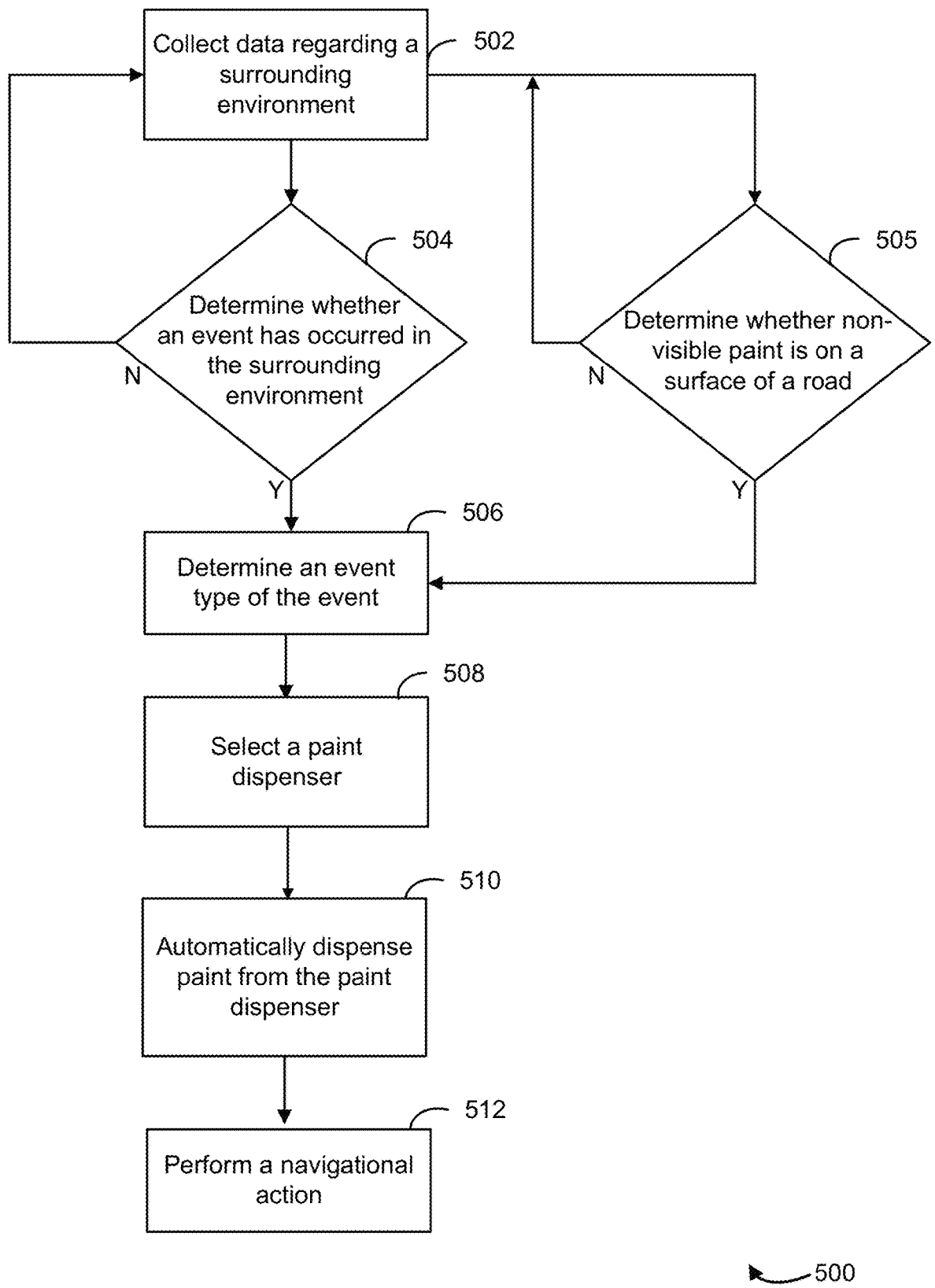
FIG. 5 is a method for dispensing road markings outside of a visible spectrum by an autonomous vehicle, according to an embodiment.

The memory 214 of the autonomy system 250 may store data and/or software routines that may assist the autonomy system 250 in performing autonomy system 250's functions, such as the functions of the perception module 202, the mapping/localization module 204, the vehicle control module 206, a road signal module 230, and the method 500 described herein with respect to FIG. 5. Further, the memory 214 may also store data received from various inputs associated with the autonomy system 250, such as perception data from the perception system.

As noted above, the perception module 202 may receive input from the various sensors, such as the camera system 220, the LiDAR system 222, the GNSS receiver 208, and/or the IMU 224 (collectively "perception data") to sense an environment surrounding the vehicle 200 and interpret it. To interpret the surrounding environment, the perception module 202 (or "perception engine") may identify and classify objects or groups of objects in the environment. For example, the vehicle 102 may use the perception module 202 to identify one or more objects (e.g., pedestrians, vehicles, debris, etc.) or features of the roadway 106 (e.g., intersections, road signs, lane lines, etc.) before or beside a vehicle and classify the objects in the road. In some embodiments, the perception module 202 may include an image classification function and/or a computer vision function.

The system 250 may collect perception data. The perception data may represent the perceived environment surrounding the vehicle, for example, and may be collected using aspects of the perception system described herein. The perception data can come from, for example, one or more of the LiDAR system, the camera system, the radar system and various other externally-facing sensors and systems on board the vehicle (e.g., the GNSS receiver, etc.). For example, in vehicles having a sonar or radar system, the sonar and/or radar systems may collect perception data. As the vehicle 102 travels along the roadway 106, the system 250 may continually receive data from the various systems on the vehicle 102. In some embodiments, the system 250 may receive data periodically and/or continuously. With respect to FIG. 1, the vehicle 102 may collect perception data that indicates the presence of the lane line 110 (e.g., in order to determine the lanes 108 and 112). Additionally, the detection systems may detect the vehicle 104 and monitor the vehicle 104 to estimate various properties of the vehicle 104 (e.g., proximity, speed, behavior, flashing light, etc.). The properties of the vehicle 104 may be stored as timeseries data in which timestamps indicate the times in which the different properties were measured or determined. The features may be stored as points (e.g., vehicles, signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 250 interacts with the various features.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real-time image data captured by, for example, the camera system 220 and the LiDAR system 222. In some embodiments, the image classification function may be configured to classify features based on information received from only a portion of the multiple available sources. For example, in the case that the captured visual camera data includes images that may be blurred, the system 250 may identify objects based on data from one or more of the other systems (e.g., the LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the vehicle 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of the vehicle 200's motion, size, etc.)

The mapping/localization module 204 receives perception data that can be compared to one or more digital maps stored in the mapping/localization module 204 to determine where the vehicle 200 is in the world and/or where the vehicle 200 is on the digital map(s). In particular, the mapping/localization module 204 may receive perception data from the perception module 202 and/or from the various sensors sensing the environment surrounding the vehicle 200 and correlate features of the sensed environment with details (e.g., digital representations of the features of the sensed environment) on the one or more digital maps. The digital map may have various levels of detail and can be, for example, a raster map, a vector map, etc. The digital maps may be stored locally on the vehicle 200 and/or stored and accessed remotely.

The vehicle control module 206 may control the behavior and maneuvers of the vehicle 200. For example, once the systems on the vehicle 200 have determined the vehicle 200's location with respect to map features (e.g., intersections, road signs, lane lines, etc.) the vehicle 200 may use the vehicle control module 206 and the vehicle 200's associated systems to plan and execute maneuvers and/or routes with respect to the features of the environment. The vehicle control module 206 may make decisions about how the vehicle 200 will move through the environment to get to the vehicle 200's goal or destination as it completes the vehicle 200's mission. The vehicle control module 206 may consume information from the perception module 202 and the mapping/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the vehicle 200 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the vehicle 200. The steering system may be any combination of mechanisms configured to adjust the heading or direction of the vehicle 200. The brake system may be, for example, any combination of mechanisms configured to decelerate the vehicle 200 (e.g., friction braking system, regenerative braking system, etc.) The vehicle control module 206 may be configured to avoid obstacles in the environment surrounding the vehicle 200 and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller for vehicle lateral motion control and a propulsion and braking controller for vehicle longitudinal motion.

The road signal module 230 may dispense paint onto a surface. For example, the perception module 202 may detect an event in the surrounding environment or an abnormality on a roadway (e.g., a crash, temporary constructs, a construction site, etc.). The perception module 202 may communicate data associated with the event to the road signal module 230. The road signal module 230 may determine an event type of the event based on the data. For example, the data may be image or video data of the event. The road signal module 230 may analyze the data using one or more techniques (e.g., neural networks, image processing techniques) to determine the event type. Event types may include temporal designations (e.g., a short duration event, a long duration event, etc.), distance designations (e.g., feet, yards, miles, away), characteristic designations (e.g., construction zone, road debris, etc.), emergency designations (e.g., high emergency, low emergency), or any other categorization of event type.

Responsive to determining the type of event, the road signal module 230 may select a paint dispenser from a set of paint dispensers. For example, a first subset of paint dispensers may be associated with indicating a duration of the event. A first color of the first subset may indicate the event is predicted to last for a short period of time (e.g., 1 hour). A second color of the first subset may indicate the event is predicted to last for a long period of time (e.g., multiple days). In some examples, the first color and the second color may disappear (e.g., dissolve, become undetectable by a sensor) after the respective period of time has elapsed. A second subset of paint dispensers may be associated with communicating the type of event. For example, each type of event may be associated with a respective type of paint. In some cases, how the paint dispenser dispenses the paint determines the information communicated to other vehicles. For example, the paint dispenser might communicate the duration of the event by the color of the paint and the event type by the shape, mark, or pattern of the paint made while dispensing the paint. In some cases, the paint may be dispensed to create a barcode (e.g., a quick response (QR) code) on the surface of the road, or dispense another symbol to convey information.

In some cases, the road signal module 230 may communicate with a database. For example, the database may be a local database stored in memory 214, a remote database stored on a remote computer or stored on a cloud network, or partially stored on a combination thereof. The database may include a mapping between the event types and distance to the event and different types of paint and/or designs. For example, each paint may include respective characteristics (e.g., color, wavelength, durability). Based on the respective characteristics, paint may be selected to represent different types of events and distances to the event. For example, a car crash may be associated with a first type of paint, a construction zone may be associated with a second type of paint, a distance of 100 meters to the car crash may be associated with the first type of paint, and a distance of 200 meters to the car crash may be associated with a third type of paint. In some cases, a design (e.g., shape, mark, pattern) may be selected in addition to the paint type to communicate additional information. In some cases, the paint type and/or the designs may indicate a type of event, a duration of the event, a distance to the event, navigational information (e.g., a location, a speed limit, other information that can be included on a road sign), or a navigational command (e.g., merge into another lane, reduce speed), among other information. For example, the car crash may be associated with a first design and the distance to the car crash may be associated with different types of paint (e.g., a first type of paint dispensed according to the first design may indicate 100 meters to a car crash and a second type of paint dispensed according to the first design may indicate 200 meters to the car crash).

In some examples, a second vehicle 102 may detect the paint on the road. The second vehicle 102 may detect the paint (e.g., via a respective perception module 202) before detecting the event. For example, the second vehicle 102 may include a sensor (e.g., a multi-spectral sensor, a video or image capturing device, etc.). The second vehicle 102 may monitor the road ahead of the second vehicle 102 and detect the paint. The second vehicle 102 may query a database and determine information associated with the paint. For example, the information may include a type of the event, navigational information, or a navigational command. The second vehicle 102 may determine a navigational action to perform based on the information. In some cases, the second vehicle 102 may update the paint. For example, the second vehicle 102 may dispense same or different second paint on the road based on changes to the event. The second vehicle 102 may dispense the second paint at a distance further from the event than the first paint to support communication of the event to other vehicles 102 earlier.

Figure 3:
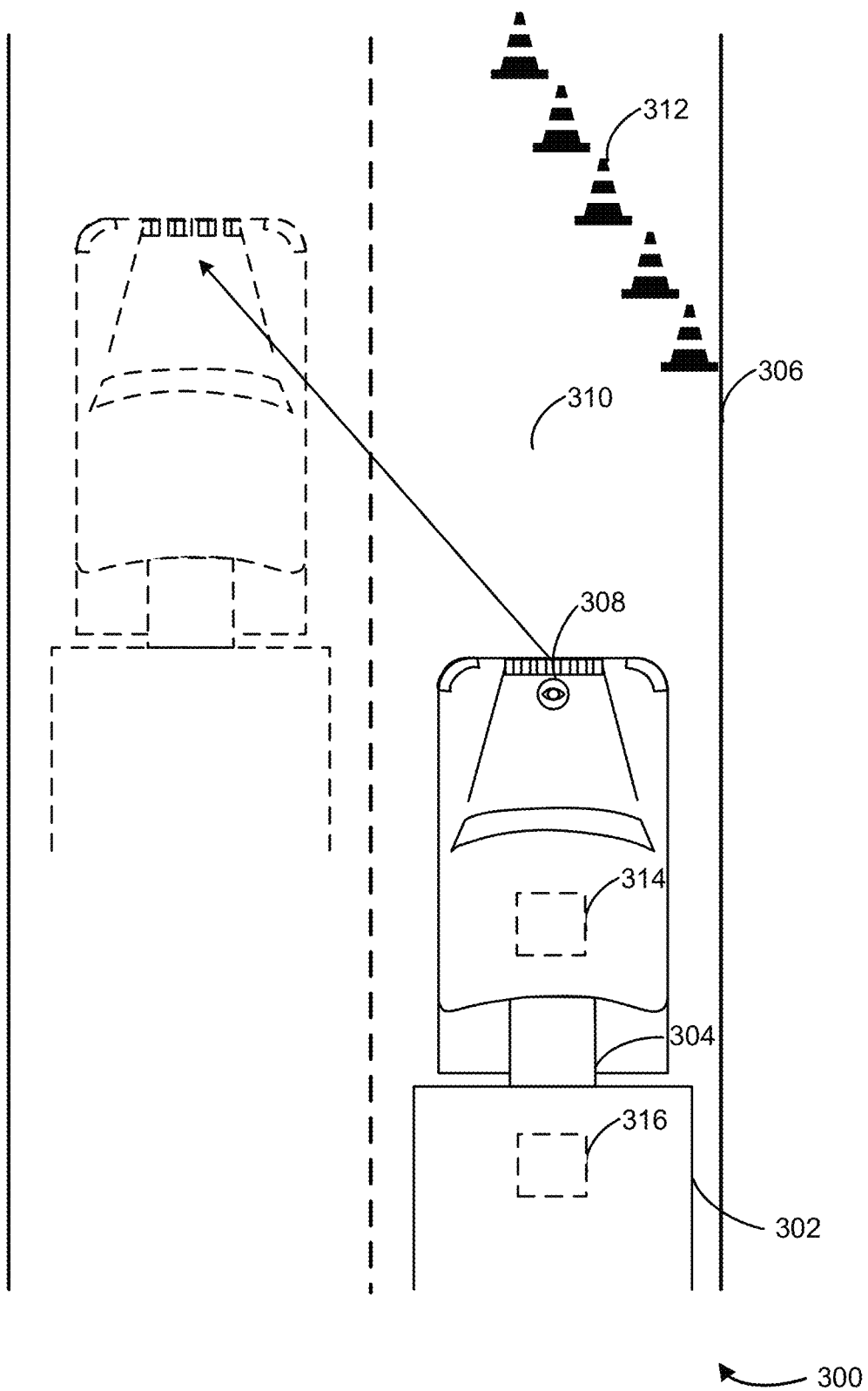
FIGS. 3-4 are bird's-eye views of roadways that support dispensing road markings outside of a visible spectrum by an autonomous vehicle, according to embodiments.

FIG. 3 is a bird's-eye view of a roadway that supports dispensing road markings outside of a visible spectrum, according to an embodiment. FIG. 3 illustrates an environment 300 that includes a vehicle 302 and a roadway 306. The vehicle 302 can include one or more sensors 308, an autonomy system 304, and paint dispensers 314 (e.g., located below the vehicle 302, on a surface of the vehicle 302). The vehicle 302 can be the same as or similar to the vehicle 102. The roadway 306 can include a surface 310 and an event (e.g., abnormality) 312.

In some cases, the vehicle 302 may monitor (e.g., collect data regarding) the environment 300. The vehicle 302 may detect, via the sensors 308 (e.g., a range of multi-spectral sensors), the event 312. In some cases, the event 312 can be a construction zone, a police barrier, or other type of event. The vehicle 302 may determine the event type based on the collected data. For example, the vehicle 302 may utilize one or more techniques (e.g., image processing, neural networks, etc.) to determine the type of the event 312. In some cases, the vehicle 302 may query a database responsive to the determination of the event type. The database may include event types corresponding to types of paint, designs (e.g., patterns, shapes, amount of paint), barcodes (e.g., QR codes), etc.

Based on the event type, the vehicle 302 may select one or more paint dispensers 314 to dispense paint. For example, the vehicle 302 may select a first type of paint including a first set of characteristics corresponding to the event 312. In one example, the event 312 is a crash. The vehicle 302 may determine an approximate period of time the crash is expected to last (e.g., based on the database or based on one or more calculations). The vehicle 302 may select a paint 316 reflective in the infrared spectrum to indicate the period of time, a design (e.g., a line, a symbol, a mark, a pattern), and a distance between to the crash to indicate the event type. Advantageously, by reflecting in a non-visible wavelength, the paint 316 may avoid interfering with other existing road markings (e.g., for human operated vehicles). In some implementations, the first set of characteristics may include reflectivity, wavelength (e.g., spectral bands), color, durability, design, or other types of characteristics. Each characteristic may correspond to a distance, duration of time, navigational information, navigational command, or other type of information. Responsive to selecting the one or more paint dispensers 314, the vehicle 302 may dispense the paint 316 onto the surface 310 of the road 306. In some examples, the vehicle 302 may dispense the paint 316 below, in front of, or behind the vehicle 302 while driving on the road 306. The vehicle 302 may perform a navigation action (e.g., merge into another lane) in response to dispensing the paint 316 and detecting the event 312.

In some cases, based on the event type, the paint 316 may disappear after a period of time has elapsed. Various embodiments of the paint 316 may remain on the surface 310 of the road 306 for varying durations. The vehicle 302 may select the type of paint based on an expected duration of the type of the event 312 encountered. For example, the event 312 may be a construction or repair zone that is expected to last for an entire day. The event 312 may be an accident (e.g., a crash) that is expected to last for multiple hours. The event 312 may be a police pull-over that is expected to last for multiple minutes. For each example, the paint 316 may disappear after the respective period of time has elapsed. In some cases, an emergency vehicle (e.g., an ambulance, a firetruck, a police vehicle, or a construction vehicle) may dispense the paint in response to establishing the event 312 or arriving to the event 312. In some cases, the paint dispensers 314 may be a part of a hand-held system that may be operated by forward observers of a military ground force to mark routes for incoming troops. For example, by selecting a reflective waveband and adjusting a duration of the paint the paint may result in increased security in signaling to the incoming troops (e.g., hard to detect by enemy troops, unknown code).

Figure 4:
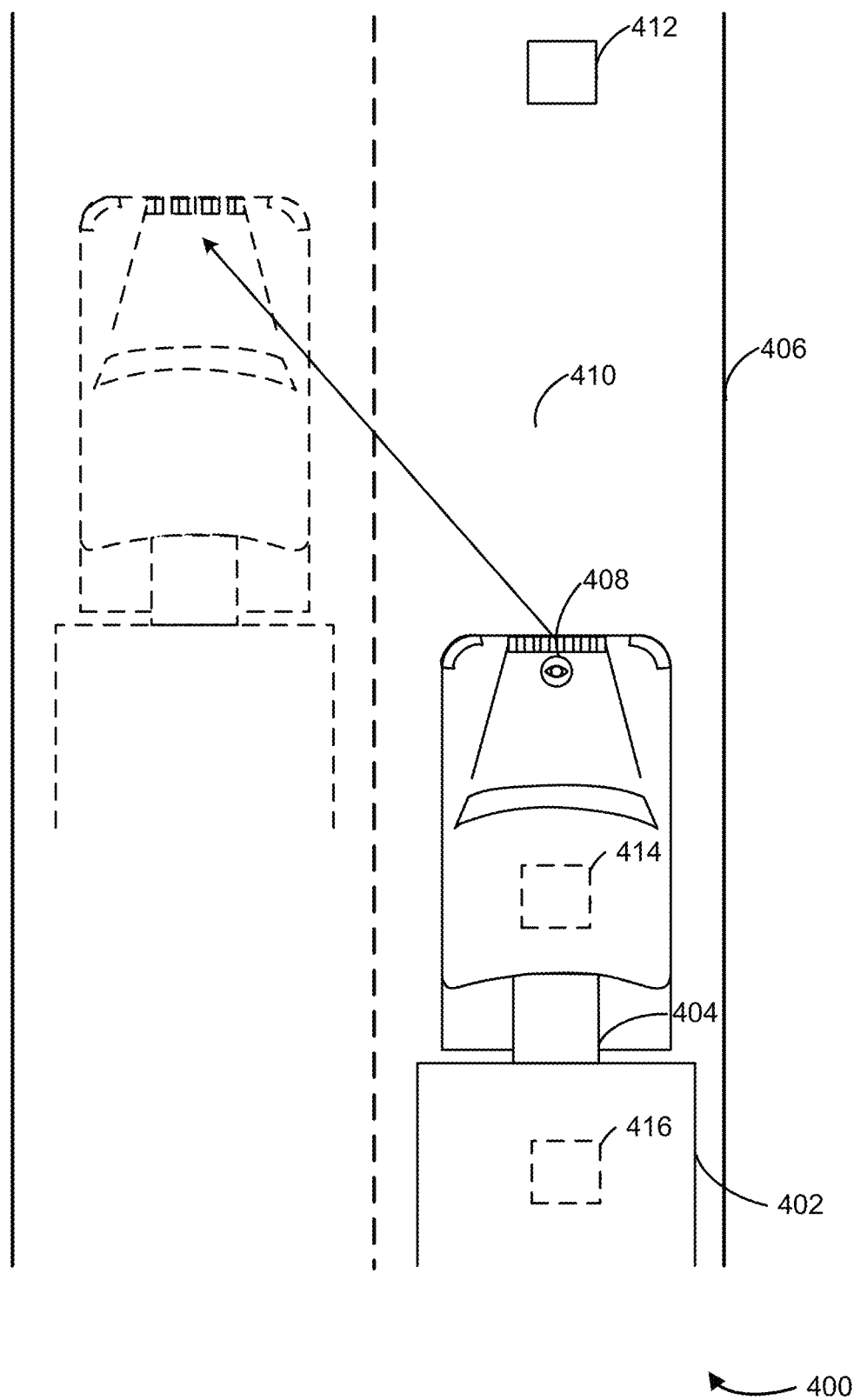

FIG. 4 is a bird's-eye view of a roadway that supports dispensing road markings outside of a visible spectrum, according to an embodiment. FIG. 4 illustrates an environment 400 that includes a vehicle 402 and a roadway 406. The vehicle 402 can include one or more sensors 408, an autonomy system 404, and paint dispensers 414 (e.g., located below the vehicle 402, on a surface of the vehicle 402). The vehicle 402 can be the same as or similar to the vehicle 102. The roadway 406 can include a surface 410 and paint (e.g., a marking) 412.

In some cases, the vehicle 402 may monitor (e.g., collect data regarding) the road 406. The vehicle 402 may detect, via the sensors 408 (e.g., a range of multi-spectral sensors), the paint 412. For example, the paint 412 may correspond to an event (e.g., the event 312). The vehicle 402 may detect the paint 412 before detecting (e.g., before being in proximity to) the event. The paint 412 may include one or more characteristics. For example, the paint 412 may be reflective in the non-visible spectrum (e.g., may be reflective in a first spectral band of the non-visible spectrum). The paint 412 may be of a type of durability (e.g., soluble) that will disappear after a period of time after being dispensed has elapsed. The paint 412 may be configured according to a type of design (e.g., a QR code, a line, a shape, a symbol).

The vehicle 402 may determine information associated with the event based on the one or more characteristics of the paint 412. The vehicle 402 may query a database (e.g., a local database, a remote database) based on the one or more characteristics. The query may include an indication of the one or more characteristics. The database may include information (e.g., a distance to the event, a type of the event, a duration of the event, navigational information, or one or more navigational commands) associated with the event corresponding to the one or more characteristics. Based on the information, the vehicle 402 may determine a navigational action to perform. For example, the event may be a crash in a first lane that the vehicle 402 is currently driving. Advantageously, the vehicle 402 may determine to merge into a second adjacent lane to avoid congestion caused by the crash in the first lane.

In some cases, responsive to detecting the paint 412, the vehicle 402 may dispense second paint 416. For example, the paint 412 may be located a first distance away from the event. To increase communication to other vehicles, the vehicle 402 may dispense the second paint 416 at a location at a second distance further than the first distance away from the event. Other vehicles may detect the second paint 416 and perform a navigational action earlier (in relation to arriving at the event) than if they detected the first paint 412. In some cases, the vehicle 402 may dispense the second paint 416 different from the first paint 412. For example, based on a duration since the first paint 412 was dispensed, the vehicle 402 may calculate (e.g., based on a difference between the duration and the current elapsed time) a second duration before the first paint 412 disappears. The second duration can be the amount of time until the first paint disappears. The vehicle 402 can determine the current elapsed time using machine learning techniques, for example, or any other techniques based on characteristics of the paint 412 (e.g., an amount of fading in the paint 412, which can be depicted in images or other sensor data that capture the paint 412). The vehicle 402 may dispense the second paint 416 with a characteristic to disappear in accordance with the second duration. In some cases, the vehicle 402 may select the second paint 416 with a characteristic corresponding to the second distance away from the event.

FIG. 5 shows execution steps of a processor-based method using the system 250, according to some embodiments. The method 500 shown in FIG. 5 comprises execution steps 502-512. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously.

FIG. 5 is described as being performed by a data processing system stored or on or otherwise located at an autonomous vehicle, such as the autonomous vehicle 102, 302, or 402 depicted in FIGS. 1, 3, and 4. However, in some embodiments, one or more of the steps may be performed by a different processor, server, or any other computing feature. For instance, one or more of the steps may be performed via a cloud-based service or another processor in communication with the processor of an autonomous vehicle and/or the autonomy system of such an autonomous vehicle.

At 502, the data processing system collects, using a sensor of the autonomous vehicle, data regarding an environment surrounding the autonomous vehicle as the autonomous vehicle is moving on a surface. At 504, the data processing system determines whether an event has occurred in the surrounding environment from the data collected. For example, the data processing system can detect the event based on processing (e.g., according to one or more processing techniques) image or video data obtained from the sensor (e.g., a video or image device, camera, LiDAR device). In some embodiments, the data processing system can detect an abnormality on a road in the surrounding environment. For example, the abnormality may be debris located on the road in the surrounding environment. In some cases, at 505, the data processing system determines whether paint (e.g., non-visible paint) is on a surface of a road from the data collected. For example, the data processing system can detect the paint on the surface of the road based on processing data obtained from the sensor (e.g., multi-spectral sensors).

At 506, if the data processing system detects the event, the data processing system determines an event type of the event based on the collected data. For example, the data processing system can utilize image processing algorithms, machine learning models (e.g., one or more neural networks, support vector machines, random forests, etc.) or other techniques to process the data (e.g., image or video data). By utilizing such techniques, the data processing system can categorize the event into one of a set of event types. For example, the set of event types may include temporal designations (e.g., a short duration event, a long duration event, etc.), characteristic designations (e.g., construction zone, road debris, etc.), emergency designations (e.g., high emergency, low emergency), distance to the event designations, or any other categorization of event type.

At 508, the data processing system selects a paint dispenser from multiple paint dispensers based on the determined event type. For example, each dispenser can correspond to a different type of event and include paint of a different spectral band outside of a visible spectrum (e.g., within a non-visible spectrum). The data processing system can select a first paint dispenser that corresponds to the determined event type. In some cases, the paint dispensers can include sets of paint dispensers for each spectral band. Each paint dispenser of a set can correspond to a distance between a current location of the autonomous vehicle and events detected by the autonomous vehicle. For example, if the event is a first distance away from the autonomous vehicle (e.g., 500 feet), the data processing system may select a paint dispenser from the set that corresponds to the first distance. In some implementations, each paint dispenser of the multiple paint dispensers can correspond to a defined period of time in which the paint of the respective paint dispenser will remain on the surface (e.g., a period of time from dispensing the paint till the paint disappears). For example, if the event type corresponds to a short duration of time (e.g., one hour), the data processing system may select a paint dispenser that will remain on the surface for the short duration (e.g., that will disappear after the short duration expires). In some examples, the data processing system can select a paint to load into a paint dispenser (e.g., rather than selecting a paint dispenser, in addition to selecting a paint dispenser).

At 510, the data processing system automatically dispenses paint from the selected paint dispenser onto the surface. In some cases, the data processing system can dispense the paint according to one or more designs (e.g., patterns, shapes, QR codes). For example, the data processing system can query a database, the query including the event type. The database can include a mapping between event types and characteristics of types of paint, a design, and other information (e.g., navigational commands). The data processing system can obtain the characteristics and the design from the database and select the paint (e.g., the paint dispenser) that corresponds to the characteristics and dispense the paint onto the surface according to the design. At 512, the data processing system performs a navigational action based on the detected event.

In some implementations, the data processing system may detect a second event in the environment. The data processing system can determine a second event type of the second event and determine a second period of time associated with the second event type that is different from a first period of time associated with the first event type. The data processing system can select a second paint dispenser, different from the first paint dispenser, based on the second period of time and automatically dispense second paint associated with the second period of time from the selected second paint dispenser onto the surface.

At 506, if the data processing system detects paint on the surface of the road (e.g., first paint, second paint detected after dispensing first paint on the surface of the road), the data processing system determines the event type of the paint based on determining one or more characteristics of the paint. For example, the one or more characteristics can include a first spectral band of the detected paint. The first spectral band may be of a non-visible spectrum. For example, a standard may separate the non-visible spectrum into multiple bands (e.g., ranges of wavelengths). The paint may reflect a wavelength that is within a first spectral band of the standard. The first spectral band may correspond to an event type, navigational commands, a distance to the event, a duration of time corresponding to the event, or other information.

At 508, responsive to detecting the paint (e.g., second paint), the data processing system selects a paint dispenser (e.g., a second paint dispenser) based on the first spectral band of the paint. In some cases, the paint dispenser corresponds to a second spectral band different from the first spectral band. For example, the data processing system can determine the first spectral band to correspond to a first period of time, indicating that the paint will disappear after the first period of time elapses. The data processing system can determine a second period of time associated with a difference between the first period of time and an elapsed time period (e.g., an amount of time that the paint has been on the road). The second spectral band may correspond to the second period of time (e.g., will disappear after the second period of time elapses). In this way, the detected paint and the selected paint may disappear at the same time (e.g., approximately the same time). At 510, the data processing system automatically dispenses paint from the selected paint dispenser (e.g., the second paint dispenser) onto the surface.

At 512, the data processing system performs a navigational action based on the detected paint. For example, the data processing system can query a database, the query including an indication of the detected paint. The database can include a mapping between paints (e.g., characteristics of paints) and navigational commands, event types, distance to the event, a period of time the event is approximated to last, or other information. The data processing system can obtain the information from the database and determine a navigational action based on the information. For example, the data processing system may obtain a command to merge into another lane based on the first spectral band of the paint. The data processing system may control the autonomous vehicle to merge the autonomous vehicle into another lane based on the command. In some implementations, the data processing system can select the navigational action from multiple navigational actions based on the first spectral band.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. An autonomous vehicle, comprising:
a sensor;
a plurality of paint dispensers, each dispenser corresponding to a different type of event and comprising paint of a different spectral band, the different spectral band corresponding to the different type of event, wherein paint from each of the plurality of paint dispensers is outside of a visible spectrum; and
one or more processors configured to:
    collect, using the sensor, data regarding an environment surrounding the autonomous vehicle as the autonomous vehicle is moving on a surface;
    detect an event in the environment surrounding the autonomous vehicle from the collected data;
    determine an event type of the event based on the collected data;
    select a paint dispenser from the plurality of paint dispensers based on the determined event type; and
    automatically dispense paint from the selected paint dispenser onto the surface.

2. The autonomous vehicle of claim 1, wherein the one or more processors are configured to:
 detect, via the sensor, second paint on the surface; and
 perform a navigational action based on the detection of the second paint.

3. The autonomous vehicle of claim 2, wherein:
 the second paint comprises a first spectral band, and
 the autonomous vehicle selects the navigational action from a plurality of navigational actions based on the first spectral band.

4. The autonomous vehicle of claim 1, wherein the one or more processors are configured to detect the event by:
 detecting an abnormality on a road in the environment surrounding the autonomous vehicle.

5. The autonomous vehicle of claim 1, wherein the one or more processors are configured to:
 detect second paint on the surface;
 responsive to detecting the second paint, select a second paint dispenser based on a spectral band of the second paint; and
 automatically dispense third paint from the selected second paint dispenser onto the surface.

6. The autonomous vehicle of claim 1, wherein the plurality of paint of dispensers comprises a set of paint dispensers for a spectral band, each paint dispenser of the set corresponding to a distance between a current location of the autonomous vehicle and events detected by the autonomous vehicle.

7. The autonomous vehicle of claim 1, wherein the one or more processors are configured to:
 detect second paint on the surface;
 determine one or more characteristics of the detected second paint, the one or more characteristics comprising a first spectral band of the detected second paint;
 select a second paint dispenser from the plurality of paint dispensers that corresponds to a second spectral band based on the first spectral band of the detected paint; and
 automatically dispense third paint from the selected second paint dispenser onto the surface.

8. The autonomous vehicle of claim 1, wherein the paint of the plurality of paint dispensers is configured to indicate the event type, navigational commands, distance to the event, or any combination thereof.

9. The autonomous vehicle of claim 1, wherein each paint dispenser corresponds to a defined period of time in which paint of the respective paint dispenser will remain on the surface.

10. The autonomous vehicle of claim 1, wherein the event type is associated with a first period of time, the one or more processors are further configured to:
 collect, using the sensor, second data regarding the environment surrounding the autonomous vehicle;
 detect a second event in the environment surrounding the autonomous vehicle from the collected second data, wherein the second event is of a second event type;
 determine a second period of time associated with the second event type, wherein the second period of time is different from the first period of time associated with the event;
 select a second paint dispenser, different from the paint dispenser, from the plurality of paint dispensers based on the second period of time; and
 automatically dispense second paint associated with the second period of time from the selected second paint dispenser onto the surface.

11. A method for dispensing paint onto a surface, comprising:
 collecting, by at least one processor using a sensor, data regarding an environment surrounding a vehicle as the vehicle is moving on the surface;
 detecting, by the at least one processor, an event in the environment surrounding the vehicle from the collected data;
 determining, by the at least one processor, an event type of the event based on the collected data;
 selecting, by the at least one processor, a paint dispenser from a plurality of paint dispensers based on the determined event type, each dispenser of the plurality of paint dispensers corresponding to a different type of event and comprising paint of a different spectral band, the different spectral band corresponding to the different type of event, wherein paint from each of the plurality of paint dispensers is outside of a visible spectrum; and
 automatically dispensing, by the at least one processor, paint from the selected paint dispenser onto the surface.

12. The method of claim 11, further comprising:
 detecting, via the sensor, second paint on the surface; and
 performing a navigational action based on the detection of the second paint.

13. The method of claim 12, wherein:
 the second paint comprises a first spectral band, and
 the vehicle selects the navigational action from a plurality of navigational actions based on the first spectral band.

14. The method of claim 11, wherein detecting the event further comprises:
 detecting an abnormality on a road in the environment surrounding the vehicle.

15. The method of claim 11, further comprising:
 detecting second paint on the surface;
 responsive to detecting the second paint, selecting a second paint dispenser based on a spectral band of the second paint; and
 automatically dispensing third paint from the selected second paint dispenser onto the surface.

16. A controller comprising:
 one or more processors, the one or more processors configured to:
 collect, using the sensor, data regarding an environment surrounding an autonomous vehicle as the autonomous vehicle is moving on a surface;
 detect an event in the environment surrounding the autonomous vehicle from the collected data;
 determine an event type of the event based on the collected data;
 select a paint dispenser from a plurality of paint dispensers based on the determined event type, each dispenser of the plurality of paint dispensers corresponding to a different type of event and comprising paint of a different spectral band, the different spectral band corresponding to the different type of event, wherein paint from each of the plurality of paint dispensers is outside of a visible spectrum; and
 automatically dispense paint from the selected paint dispenser onto the surface.

17. The controller of claim 16, wherein the one or more processors are configured to:
 detect, via the sensor, second paint on the surface; and
 perform a navigational action based on the detection of the second paint.

18. The controller of claim 17, wherein:
 the second paint comprises a first spectral band, and the autonomous vehicle selects the navigational action from a plurality of navigational actions based on the first spectral band.

19. The controller of claim 16, wherein the one or more processors are configured to detect the event by:
detecting an abnormality on a road in the environment surrounding the autonomous vehicle.

20. The controller of claim 16, wherein the one or more processors are configured to:
detect second paint on the surface;
responsive to detecting the second paint, select a second paint dispenser based on a spectral band of the second paint; and
automatically dispense third paint from the selected second paint dispenser onto the surface.

* * * * *